US010573274B2

United States Patent
Champel et al.

(10) Patent No.: US 10,573,274 B2
(45) Date of Patent: Feb. 25, 2020

(54) METHOD AND APPARATUS FOR TRANSMISSION AND RECEPTION OF MEDIA DATA

(71) Applicant: INTERDIGITAL CE PATENT HOLDINGS, Paris (FR)

(72) Inventors: Mary-Luc Champel, Marpire (FR); Franck Aumont, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/030,585

(22) PCT Filed: Oct. 22, 2014

(86) PCT No.: PCT/EP2014/072648
§ 371 (c)(1),
(2) Date: Apr. 19, 2016

(87) PCT Pub. No.: WO2015/059189
PCT Pub. Date: Apr. 30, 2015

(65) Prior Publication Data
US 2016/0267879 A1    Sep. 15, 2016

(30) Foreign Application Priority Data
Oct. 23, 2013  (EP) .................... 13306458

(51) Int. Cl.
*G06F 17/00* (2019.01)
*G09G 5/14* (2006.01)
(Continued)

(52) U.S. Cl.
CPC ........... *G09G 5/14* (2013.01); *G06F 17/2247* (2013.01); *H04N 5/44591* (2013.01);
(Continued)

(58) Field of Classification Search
CPC ............................ G06F 17/212; G06F 17/211
See application file for complete search history.

(56) References Cited

U.S. PATENT DOCUMENTS

| 7,788,578 B1 | 5/2010 | Poozhiyil et al. |
| 70,147,198 | 5/2017 | Herz et al. |

(Continued)

FOREIGN PATENT DOCUMENTS

| CN | 1698048 A | 11/2005 |
| CN | 1716191 A | 1/2006 |

(Continued)

OTHER PUBLICATIONS

Champel, M., "Personalization Parameters for MIMT-CI", International Organization for Standardization ISO-IEC JTC1/SC29/WG11 Coding of Moving Pictures and Audio, Geneva, Switzerland, Oct. 2013, pp. 1-3.

(Continued)

*Primary Examiner* — Andrew T McIntosh
(74) *Attorney, Agent, or Firm* — Brian J. Dorini, Esquire; Robert D. Shedd, Esquire

(57) ABSTRACT

A method of transmitting media data and display composition data for rendering the media data on a display region is described. In the method, the display composition data defines the spatial and/or temporal relationship between one or more media entities of the media data, the display region being composed of one or more display sub-regions. The method also includes the steps of transmitting display modification data, for a respective display region and/or a respective display sub-region, the display modification data indicating how the visual configuration of the respective display region or display sub-region may be modified by a user.

23 Claims, 6 Drawing Sheets

(51) Int. Cl.
*H04N 5/445* (2011.01)
*H04N 21/431* (2011.01)
*H04N 21/485* (2011.01)
*H04N 21/236* (2011.01)
*H04N 21/6547* (2011.01)
*G06F 17/22* (2006.01)
*H04N 21/8543* (2011.01)
*H04N 5/45* (2011.01)

(52) U.S. Cl.
CPC ... *H04N 21/23614* (2013.01); *H04N 21/4316* (2013.01); *H04N 21/4858* (2013.01); *H04N 21/6547* (2013.01); *G09G 2354/00* (2013.01); *H04N 5/45* (2013.01); *H04N 21/8543* (2013.01)

(56) References Cited

U.S. PATENT DOCUMENTS

| | | | |
|---|---|---|---|
| 2004/0027369 A1 | 2/2004 | Kellock et al. | |
| 2005/0207736 A1* | 9/2005 | Seo | G11B 27/105 386/243 |
| 2007/0022389 A1* | 1/2007 | Ording | G06F 3/0481 715/790 |
| 2009/0031247 A1* | 1/2009 | Walter | G06F 9/4443 715/788 |
| 2011/0302528 A1* | 12/2011 | Starr | G06F 9/451 715/800 |
| 2012/0166985 A1 | 6/2012 | Friend et al. | |
| 2012/0324521 A1* | 12/2012 | Rhyu | H04N 21/84 725/109 |
| 2013/0094563 A1* | 4/2013 | Bae | H04N 21/236 375/240.01 |
| 2013/0111330 A1* | 5/2013 | Staikos | G06F 17/21 715/241 |
| 2013/0191861 A1 | 7/2013 | Sasaki et al. | |

FOREIGN PATENT DOCUMENTS

| | | |
|---|---|---|
| CN | 101796478 A | 8/2010 |
| WO | WO03041405 | 5/2003 |

OTHER PUBLICATIONS

Park et al., "Text of ISO/IEC CD 23008-11 MPEG Media Transport CI", International Organization for Standardization ISO-IEC JTC1/SC29/WG11 MPEG/N13717, Coding of Moving Pictures and Audio, Vienna, Austria, Aug. 2013, pp. 1-45.
Japanese Office Action dated Sep. 4, 2018.
Chinese Office Action dated May 23, 2018.

* cited by examiner

METHOD AND APPARATUS FOR TRANSMISSION AND RECEPTION OF MEDIA DATA

This application claims the benefit, under 35 U.S.C. § 365 of International Application PCT/EP14/072648, filed Oct. 22, 2014, which was published in accordance with PCT Article 21(2) on Apr. 30, 2015 in English and which claims the benefit of European patent application 13306458.4, filed Oct. 23, 2013.

TECHNICAL FIELD

This invention relates to a method and an apparatus for transmission and reception of media data. Particularly, but not exclusively the invention relates to the transmission and reception of Media data, such as MPEG type data, and a method and apparatus for rendering media content, on a display.

BACKGROUND

Media content such as image, text, audio and video data or any combination thereof can be delivered across communication networks and reproduced on user terminals including media players such as multimedia players.

Multi-media services provide various types of media content such as video, audio, image and text data. Multi-media players are devices that render combinations of video, audio or data content for consumption by users. The reproduction of the media content may be performed by visible display, audio sound etc. When different media content components are delivered to a user terminal in the form of multimedia, it is important to determine the reproduction timing and the display positions of the media content components for effective consumption and presentation.

MPEG-H part 1 standard (also known as MPEG Multimedia Transport or MMT) defines a complete solution for packaging, transport and composition of timed and non-timed media content, such as for example, image data, audio data, text data and the like. MMT is currently under development, with a draft standard described in "Text of ISO/IEC 2nd CD 23008-1 MPEG Media Transport, MPEG/N13293," Geneva, Switzerland, January 2013 (hereinafter "MMT_CD"). While MMT primarily addresses IP networks, it also supports delivery of content over any type of packet-based networks. In particular, MMT may be used for delivery of audiovisual services over broadcast networks such as terrestrial, cable or satellite networks.

MMT-CI (where CI refers to compositional information) controls the temporal and spatial layout of the content of media data on a display. While MMT-CI offers the possibility for content providers to describe how media content is initially composed on the display and how the compositional arrangement can evolve in time, there is nothing to provide user personalization of the final rendering. An MMT terminal may allow a user to alter the display by "editing" the current versions of the HTML5 page and the CI elements. However, without proper constraints, such editing can quickly lead to disruption of the rendering of the media content. Moreover, if a content provider does not wish the final rendering of its media content to be modified by the user, MMT-CI does not offer possibilities to prevent unwanted modifications.

The present invention has been devised with the foregoing in mind.

SUMMARY

In a general form the invention concerns providing display modification data for the display of media data content of one or more media content components or entities. The media data is associated with display composition data for rendering the one or more media content components on at least one display region wherein the display composition data defines the spatial and/or temporal relationship between the one or more media content components of the media data. A display region is composed of one or more display sub-regions. The method includes providing display modification data for a respective display region and/or a respective display sub-region indicating how the visual configuration of the respective display region or display sub-region may be modified by a user. The display modification data may include a modification lock parameter for a respective display region and/or display sub-region indicating whether or not the visual configuration of the respective display region or display sub-region may be modified by a user; a lock to view indicating whether or not a display sub-region may be displayed on another display region; and/or a display visibility parameter defining the minimum proportion of a display sub-region or the media entity(ies) of the display to be visible during display on the display region.

The term media content component may refer to a component of media content, a media object, a media data entity, a media asset, such as for example an MMT asset, or the like. In MMT-CI for example, a display region may correspond to a View and a display sub-region may correspond to an Area within the View.

According to a first aspect of the invention there is provided a method of transmitting display composition data for rendering content of media data on at least one display region, a display region being composed of one or more display sub-regions, wherein the display composition data defines at least one of the spatial relationship and the temporal relationship between content components of the media data, the method comprising transmitting display modification data, for a respective display region and/or a respective display sub-region, on which one or more media content components may be rendered, the display modification data indicating how the visual configuration of the respective display region or display sub-region may be modified by a user.

In an embodiment, the display modification data comprises a modification lock parameter indicating whether or not the visual configuration of the respective display region or display sub-region may be modified by a user In an embodiment, the display modification data comprises at least one modification parameter indicating modification constraints imposed on user modifications of the visual configuration of the respective display region or sub-region.

The modification parameters may include for example a lock to view parameter associated with a corresponding display-sub region of a display region and indicating whether or not the corresponding display-sub region may be rendered on another display region different to the said display region and/or a display sub-region visibility parameter defining the minimum proportion of the respective display sub-region to be visible during display on a display region.

The display modification data may comprise a modification lock parameter for a particular display region, a lock parameter for each of several display regions, or a respective modification lock parameter for each display region.

In an embodiment, the respective modification lock parameter for a display region is included in a corresponding view element of the display composition data.

The display modification data may comprise a modification lock parameter for a particular display sub-region, a lock parameter for each of several display sub-regions, or a respective modification lock parameter for each display sub-region.

In an embodiment, the respective modification lock parameter for a display sub-region is included in an area element of the display composition data corresponding to the respective display sub-region.

In an embodiment, the at least one modification parameter comprises a lock to view parameter indicating whether or not media data displayed on a respective display region may be displayed on another display region different to the respective display region.

In an embodiment, the at least one modification parameter comprises, a lock to view parameter associated with a corresponding display-sub region of a display region and indicates whether or not the corresponding display-sub region may be rendered on another display region different to the said display region.

In an embodiment, the lock to view parameter is included in an area element of the composition data corresponding to the said display sub-region.

In an embodiment, the at least one modification parameter comprises a display sub-region visibility parameter defining the minimum proportion of the respective display sub-region to be visible during display The display modification data may comprise a display sub-region visibility parameter for a particular display sub-region, a display sub-region visibility for each of several display sub-regions, or a respective display sub-region visibility parameter for each display sub-region.

In an embodiment, the display sub-region visibility parameter is included in an area element of the composition data corresponding to the said display sub-region.

In an embodiment, the display sub-region visibility parameter is based on the ratio of the surface area of the display sub-region and the total surface area of other display sub-regions overlapping the said display sub-region.

In an embodiment, the display sub-region visibility parameter Visibility($Area_N$) for subregion $Area_N$ is determined according to:

$$\text{Visibility}(Area_N) = \frac{\text{Transparency}(Area_N) * \text{Surface}(Area_N)}{\sum_{i=1}^{i=n} \text{Transparency}(Area_i) * \text{Surface}(Area_i)}$$

where $Area_i$ refers to all Areas overlapping with $Area_N$ and Transparency corresponds to a weighting factor corresponding to the amount of transparency of the corresponding display sub-region.

In an embodiment, the at least one modification parameter comprises a display visibility parameter defining the minimum proportion of the media content component to be visible during display on the corresponding display region or display sub-region.

In an embodiment, the display composition data comprises MMT composition information. In an embodiment, the MMT composition information is represented as an XML document.

According to a second aspect of the invention there is provided a method of displaying content of media data on at least one display region, a display region being composed of one or more display sub-regions, the method comprising:

receiving display composition data for rendering content of media data on at least on display region, wherein the display composition data defines at least one of the spatial relationship and the temporal relationship between content components of the media data, and display modification data, for a respective display region and/or a respective display sub-region the display modification data indicating how the visual configuration of the respective display region or display sub-region may be modified by a user;

rendering content components of the media data on the display region in accordance with a first display configuration defined by the display composition data, wherein a display region or display sub-regions may be modified by the user in dependence upon the display modification data.

In an embodiment, the display modification data comprises a modification lock parameter indicating whether or not the visual configuration of the respective display region or display sub-region may be modified by the user In an embodiment, the display modification data comprises at least one modification parameter indicating modification constraints imposed on user modifications of the visual configuration of the respective display region or sub-region.

In an embodiment, the respective modification lock parameter for a display region is included in a corresponding view element of the display composition data.

In an embodiment, the respective modification lock parameter for a display sub-region is included in an area element of the display composition data corresponding to the respective sub-region.

In an embodiment, the at least one modification parameter comprises a lock to view parameter indicating whether or not media data displayed on a respective display region may be displayed on another display region different to the respective display region.

In an embodiment, the at least one modification parameter comprises, a lock to view parameter associated with a corresponding display-sub region of the display region and indicates whether or not the corresponding display-sub region may be rendered on another display region different to the said display region.

In an embodiment, the lock to view parameter is included in an area element of the composition data corresponding to the said display sub-region.

In an embodiment, the at least one modification parameter comprises a display sub-region visibility parameter defining the minimum proportion of the respective display sub-region to be visible during display.

In an embodiment, the display sub-region visibility parameter is included in an area element of the display composition data corresponding to the said display sub-region.

In an embodiment, the display sub-region visibility parameter is based on the ratio of the surface area of the display sub-region and the total surface area of other display sub-regions overlapping the said display sub-region.

In an embodiment, the display sub-region visibility parameter Visibility($Area_N$) for subregion $Area_N$ is determined according to:

$$\text{Visibility}(Area_N) = \frac{\text{Transparency}(Area_N) * \text{Surface}(Area_N)}{\sum_{i=1}^{i=n} \text{Transparency}(Area_i) * \text{Surface}(Area_i)}$$

where $Area_i$ refers to all Areas overlapping with $Area_N$ and Transparency corresponds to a weighting factor corresponding to the amount of transparency of the corresponding display sub-region In an embodiment, the at least one modification parameter comprises a display visibility parameter defining the minimum proportion of the media content component to be visible during display on the corresponding display region or display sub-region.

In an embodiment, the display composition data comprises MMT composition information. In an embodiment, the MMT composition information is represented as an XML document.

According to a third aspect of the invention there is provided an apparatus for transmitting display composition data for rendering content of media data on at least one display region, a display region being composed of one or more display sub-regions, wherein the display composition data defines at least one of the spatial relationship and the temporal relationship between content components of the media data, the apparatus comprising a display modification parameter setting module for setting parameters of display modification data for a display region and/or a display sub-region indicating how the visual configuration of the respective display region or display sub-region may be modified by a user, and a transmitter for transmitting the display composition data and the display modification data.

In an embodiment, the modification parameter setting module is configured to set a modification lock parameter indicating whether or not the visual configuration of the respective display region or display sub-region may be modified by a user In an embodiment, the modification parameter setting module is configured to set at least one modification parameter indicating modification constraints imposed on user modifications of the visual configuration of the respective display region or sub-region.

In an embodiment, the respective modification lock parameter for a display region is included in a corresponding view element of the display composition data.

In an embodiment, the respective modification lock parameter for a display sub-region is included in an area element of the display composition data corresponding to the respective sub-region.

In an embodiment, the modification parameter setting module is configured to set a lock to view parameter indicating whether or not media data displayed on a respective display region may be displayed on another display region different to the respective display region.

In an embodiment, the modification parameter setting module is configured to set a lock to view parameter associated with a corresponding display-sub region of the display region and indicating whether or not the corresponding display-sub region may be rendered on another display region different to the said display region.

In an embodiment, the lock to view parameter is included in an area element of the composition data corresponding to the said display sub-region.

In an embodiment, the modification parameter setting module is configured to set a display sub-region visibility parameter defining the minimum proportion of the respective display sub-region to be visible during display.

In an embodiment, the display sub-region visibility parameter is included in an area element of the display composition data corresponding to the said display sub-region.

In an embodiment, the display sub-region visibility parameter is based on the ratio of the surface area of the display sub-region and the total surface area of other display sub-regions overlapping the said display sub-region.

In an embodiment, the display sub-region visibility parameter Visibility($Area_N$) for subregion $Area_N$ is determined according to:

$$\text{Visibility}(Area_N) = \frac{\text{Transparency}(Area_N) * \text{Surface}(Area_N)}{\sum_{i=1}^{i=n} \text{Transparency}(Area_i) * \text{Surface}(Area_i)}$$

where $Area_i$ refers to all Areas overlapping with $Area_N$ and Transparency corresponds to a weighting factor corresponding to the amount of transparency of the corresponding display sub-region In an embodiment, the modification parameter setting module is configured to set a display visibility parameter defining the minimum proportion of the media content component to be visible during display on the corresponding display region or display sub-region.

According to a fourth aspect of the invention there is provided a terminal device for modifying the display of content of media data on at least one display region, a display region being composed of one or more display sub-regions, the terminal device comprising a receiver for receiving display composition data for rendering content of media data on at least on display region, wherein the display composition data defines at least one of the spatial relationship and the temporal relationship between content components of the media data, and display modification data, for a respective display region and/or a respective display sub-region the display modification data indicating how the visual configuration of the respective display region or display sub-region may be modified by a user;

a rendering engine for determining, from the display composition data, the spatial, and/or temporal relationship between one or more content components of the media data;

a display for displaying content components of the media data on the display region in accordance with a first display configuration defined by the display composition data; and a user interface for modifying a display region or a display sub-region in dependence upon the display modification data.

In an embodiment, the display modification data comprises a modification lock parameter indicating whether or not the visual configuration of the respective display region or display sub-region may be modified by the user In an embodiment, the display modification data comprises at least one modification parameter indicating modification constraints imposed on user modifications of the visual configuration of the respective display region or sub-region.

In an embodiment, the respective modification lock parameter for a display region is included in a corresponding view element of the display composition data.

In an embodiment, the respective modification lock parameter for a display sub-region is included in an area element of the display composition data corresponding to the respective sub-region.

In an embodiment, the at least one modification parameter comprises a lock to view parameter indicating whether or not media data displayed on a respective display region may be displayed on another display region different to the respective display region.

In an embodiment, the at least one modification parameter comprises, a lock to view parameter associated with a corresponding display-sub region of the display region and indicates whether or not the corresponding display-sub region may be rendered on another display region different to the said display region.

In an embodiment, the lock to view parameter is included in an area element of the composition data corresponding to the said display sub-region.

In an embodiment, the at least one modification parameter comprises a display sub-region visibility parameter defining the minimum proportion of the respective display sub-region to be visible during display.

In an embodiment, the display sub-region visibility parameter is included in an area element of the display composition data corresponding to the said display sub-region.

In an embodiment, the display sub-region visibility parameter is based on the ratio of the surface area of the display sub-region and the total surface area of other display sub-regions overlapping the said display sub-region.

In an embodiment, the display sub-region visibility parameter Visibility(Area$_N$) for subregion Area$_N$ is determined according to:

$$\text{Visibility}(Area_N) = \frac{\text{Transparency}(Area_N) * \text{Surface}(Area_N)}{\sum_{i=1}^{i=n} \text{Transparency}(Area_i) * \text{Surface}(Area_i)}$$

where Area$_i$ refers to all Areas overlapping with Area$_N$ and Transparency corresponds to a weighting factor corresponding to the amount of transparency of the corresponding display sub-region In an embodiment, the at least one modification parameter comprises a display visibility parameter defining the minimum proportion of the media content component to be visible during display on the corresponding display region or display sub-region.

In an embodiment, the display composition data comprises MMT composition information. In an embodiment, the MMT composition information is represented as an XML document.

According to a fifth aspect of the invention there is provided a data packet comprising media data comprising media content for rendering on a display region, the display region being composed of one or more display sub-regions, display composition data for controlling rendering of the media data on the display region the display composition data defining at least one of the spatial relationship and the temporal relationship between content components of the media data; and display modification data, for a respective display region and/or a respective display sub-region, the display modification data indicating how the visual configuration of the respective display region or display sub-region may be modified by a user.

In an embodiment, the display modification data comprises a modification lock parameter indicating whether or not the visual configuration of the respective display region or display sub-region may be modified by the user In an embodiment, the display modification data comprises at least one modification parameter indicating modification constraints imposed on user modifications of the visual configuration of the respective display region or sub-region.

In an embodiment, the respective modification lock parameter for a display region is included in a corresponding view element of the display composition data.

In an embodiment, the respective modification lock parameter for a display sub-region is included in an area element of the display composition data corresponding to the respective sub-region.

In an embodiment, the at least one modification parameter comprises a lock to view parameter indicating whether or not media data displayed on a respective display region may be displayed on another display region different to the respective display region.

In an embodiment, the at least one modification parameter comprises, a lock to view parameter associated with a corresponding display-sub region of the display region and indicates whether or not the corresponding display-sub region may be rendered on another display region different to the said display region.

In an embodiment, the lock to view parameter is included in an area element of the composition data corresponding to the said display sub-region.

In an embodiment, the at least one modification parameter comprises a display sub-region visibility parameter defining the minimum proportion of the respective display sub-region to be visible during display.

In an embodiment, the display sub-region visibility parameter is included in an area element of the display composition data corresponding to the said display sub-region.

In an embodiment, the display sub-region visibility parameter is based on the ratio of the surface area of the display sub-region and the total surface area of other display sub-regions overlapping the said display sub-region.

In an embodiment, the display sub-region visibility parameter Visibility(Area$_N$) for subregion Area$_N$ is determined according to:

$$\text{Visibility}(Area_N) = \frac{\text{Transparency}(Area_N) * \text{Surface}(Area_N)}{\sum_{i=1}^{i=n} \text{Transparency}(Area_i) * \text{Surface}(Area_i)}$$

where Area$_i$ refers to all Areas overlapping with Area$_N$ and Transparency corresponds to a weighting factor corresponding to the amount of transparency of the corresponding display sub-region In an embodiment, the at least one modification parameter comprises a display visibility parameter defining the minimum proportion of the media content component to be visible during display on the corresponding display region or display sub-region.

In an embodiment, the display composition data comprises MMT composition information. In an embodiment, the MMT composition information is represented as an XML document.

In an embodiment the display modification data is comprised in the display composition data.

A further aspect of the invention provides a method of transmitting display composition data for rendering one or more media assets of media data on at least one view of a display, a view being composed of one or more areas, wherein the display composition data defines at least one of the spatial relationship and the temporal relationship between one or more media assets of the media data, the method comprising: transmitting display modification data, for a respective view and/or a respective area, the display modification data indicating how the visual configuration of the respective view or area may be modified by a user.

Another aspect of the invention provides a method of rendering media assets on at least one view of a display, the method comprising receiving display composition data for rendering one or more media assets of media data on at least one view, a view being composed of one or more areas, wherein the display composition data defines at least one of the spatial relationship and the temporal relationship between one or more media assets of the media data, the method comprising: receiving display modification data, for a respective view and/or a respective area, the display modification data indicating how the visual configuration of the respective view or area may be modified by a user and rendering one or media assets on the view in accordance with a first display configuration defined by the display composition data, wherein a view or area may be modified by the user in dependence upon the display modification data.

Another aspect of the invention provides apparatus for transmitting display composition data for rendering one or more media assets of media data on at least one View, a View being composed of one or more Areas, wherein the display composition data defines at least one of the spatial relationship and the temporal relationship between the media assets, the apparatus comprising: a display modification parameter setting module for setting display modification parameters for a View and/or an Area indicating how the visual configuration of the respective View or Area may be modified by a user; and a transmitter for transmitting the display composition data and the display modification data.

Another aspect of the invention provides a terminal device for modifying the display of one or more media assets of media data on at least one View, a View being composed of one or more Areas, the terminal device comprising a receiver for receiving display composition data for rendering one or more media assets on at least one View, wherein the display composition data defines at least one of the spatial relationship and the temporal relationship between media assets of the media data, and display modification data, for a respective View and/or a respective Area, the display modification data indicating how the visual configuration of the respective View or display Area may be modified by a user; a rendering engine for determining, from the display composition data, the spatial, and/or temporal relationship between one or more media assets of the media data; a display for displaying the media assets on the View in accordance with a first display configuration defined by the display composition data; and a user interface for modifying a View or an area in dependence upon the display modification data.

Another aspect of the invention provides a data packet comprising media data comprising media assets for rendering on a view, the view being composed of one or more areas, display composition data for controlling rendering of the media assets on the View, the display composition data defining at least one of the spatial relationship and the temporal relationship between the media assets; and display modification data, for a respective View and/or a respective area, the display modification data indicating how the visual configuration of the respective View or Area may be modified by a user.

In an embodiment, the display modification data comprises at least one modification lock parameter indicating whether or not the visual configuration of the respective view or area may be modified by a user and at least one modification parameter indicating modification constraints imposed on user modifications of the visual configuration of the respective View or Area. the at least one modification parameter may include A yet further aspect of the invention relates to a method of transmitting display composition data for rendering one or more media assets of media data on at least one view, a view being composed of one or more areas, wherein the display composition data defines at least one of the spatial relationship and the temporal relationship between one or more media assets of the media data, the method comprising transmitting display modification data, for a respective view and/or a respective area wherein the display modification data comprises at least one modification lock parameter indicating whether or not the visual configuration of the respective view or area may be modified by a user and at least one modification parameter indicating modification constraints imposed on user modifications of the visual configuration of the respective View or Area.

Another aspect of the invention provides a method of transmitting display composition data for rendering one or more media assets of media data on at least one view, a view being composed of one or more areas, wherein the display composition data defines at least one of the spatial relationship and the temporal relationship between one or more media assets of the media data, the method comprising: transmitting display modification data, for a respective view and/or a respective area, wherein the display modification data comprises at least one modification lock parameter indicating whether or not the visual configuration of the respective view or area may be modified by a user, at least one lock to view parameter associated with an area of a said view, the lock to view parameter indicating whether or not whether or not the corresponding area may be rendered on another View, and at least one area visibility parameter defining the minimum proportion of the respective area to be visible during display on the corresponding view.

Another aspect of the invention provides a method of displaying media assets on at least one View, a view being composed of one or more areas, the method comprising receiving display composition data for rendering the media assets on the at least one View wherein the display composition data defines at least one of the spatial relationship and the temporal relationship between one or more media assets of the media data, receiving display modification data, for a respective view and/or a respective area, wherein the display modification data comprises at least one modification lock parameter indicating whether or not the visual configuration of the respective view or area may be modified by a user, at least one lock to view parameter associated with an area of a said view, the lock to view parameter indicating whether or not whether or not the corresponding area may be rendered on another View, and at least one area visibility parameter defining the minimum proportion of the respective area to be visible during display on the corresponding view; and rendering the media assets on the at least one view in accordance with a first display configuration defined by the display composition data, wherein a view or area may be modified by the user in dependence upon the display modification data.

Another aspect of the invention provides an apparatus for transmitting display composition data for rendering one or more media assets of media data on at least one view, a view being composed of one or more areas, wherein the display composition data defines at least one of the spatial relationship and the temporal relationship between one or more media assets of the media data, the apparatus comprising: a display modification parameter setting module for setting display modification parameters, for a respective view and/or a respective area wherein the display modification parameters comprises at least one modification lock parameter indicating whether or not the visual configuration of the respective view or area may be modified by a user, at least one lock to view parameter associated with an area of a said view, the lock to view parameter indicating whether or not whether or not the corresponding area may be rendered on another View, and at least one area visibility parameter defining the minimum proportion of the respective area to be visible during display on the corresponding view; and a transmitter for transmitting the display composition data and the display modification parameters.

Another aspect of the invention provides a terminal device for modifying the display of media assets of media data on at least one view, a view being composed of one or more areas, the terminal device comprising:

a receiver for receiving display composition data for rendering the media assets on at least one view, wherein the display composition data defines at least one of the spatial relationship and the temporal relationship between the media assets, and for receiving display modification data, for a respective view and/or a respective display area wherein the display modification data comprises at least one modification lock parameter indicating whether or not the visual configuration of the respective view or area may be modified by a user, at least one lock to view parameter associated with an area of a said view, the lock to view parameter indicating whether or not whether or not the corresponding area may be rendered on another View, and at least one area visibility parameter defining the minimum proportion of the respective area to be visible during display on the corresponding view, the device further comprising:

a rendering engine for determining, from the display composition data, the spatial, and/or temporal relationship between the media assets;

a display for displaying the media assets on the View in accordance with a first display configuration defined by the display composition data; and a user interface for modifying a view or an area in dependence upon the display modification data.

An aspect of the invention provides a method of providing or processing display modification data for modifying the display of media content on a display region composed of display sub-regions, wherein the display modification data indicates how the visual configuration of or a respective display region and/or a respective display sub-region may be modified by a user.

In embodiments of the invention the display modification data comprises one or more of the following parameters:

a modification lock parameter indicating whether or not the visual configuration of the respective display region or sub-region may be modified by a user, a lock to view parameter associated with a sub-region of a display region, the lock to view parameter indicating whether or not whether or not the corresponding display sub-region may be rendered on another display region, and an area visibility parameter defining the minimum proportion of a display sub-region to be visible during display on the corresponding view.

According to a further aspect of the invention there is provided a method of transmitting media data of one or more media entities and display composition data for rendering the one or more media entities on at least one display region wherein the display composition data defines the spatial and/or temporal relationship between one or more media entities of the media data, the or each display region being composed of one or more display sub-regions the method including transmitting a modification lock parameter for a display region and/or a display sub-region indicating whether or not the visual configuration of the respective display region or display sub-region may be modified by a user.

In one embodiment, the modification lock parameter may be transmitted with the media data. In other embodiments the modification lock parameter may be transmitted separately to the media data.

In an embodiment a view lock parameter indicating whether or not the content of a media entity associated with a display region may be displayed on another display region different to the respective display region, is transmitted.

In an embodiment an area lock parameter indicating whether or not the content of a media entity associated with a display sub-region may be displayed on another display sub-region different to the respective display sub-region, is transmitted.

In an embodiment a display visibility parameter defining the minimum proportion of the media entity to be visible during display on the corresponding display region, is transmitted.

In an embodiment a display visibility parameter defining the minimum proportion of a display sub-region to be visible during display of the corresponding display region, is transmitted.

A further aspect of the invention provides a method of displaying content of one or more media entities on at least one display region of a respective display device, the or each display region being composed of one or more display sub-regions, the method comprising receiving media data of one or more media entities, display composition data defining the spatial and/or temporal relationship between the one or more media entities and a modification lock parameter for a display region and/or a display sub-region indicating whether or not the visual configuration of the respective display region or display sub-region may be modified by a user; rendering content of the one or more multimedia entities on the display region in accordance with a first predefined display configuration in accordance with the display composition data, wherein any one of the display region or display sub-regions indicated as modifiable by the corresponding modification lock parameter may be modified by an end user.

In an embodiment a view lock parameter indicating whether or not the content of a media entity associated with a display region may be displayed on another display region different to the respective display region, is transmitted.

In an embodiment an area lock parameter indicating whether or not the content of a media entity associated with a display sub-region may be displayed on another display sub-region different to the respective display sub-region, is received.

In an embodiment a display visibility parameter defining the minimum proportion of the media entity to be visible during display on the corresponding display region, is received.

In an embodiment a display visibility parameter defining the minimum proportion of a display sub-region to be visible during display of the corresponding display region, is received.

In an embodiment one or more of the modification lock parameter, the view lock parameter, the area lock parameter and the display visibility parameter is comprised in the display composition data. In another embodiment one or more of the modification lock parameter, the view lock parameter, the area lock parameter and the display visibility parameter is separate to the display composition data.

In an embodiment the display composition data comprises MMT composition information.

A further aspect of the invention provides an apparatus for transmitting media data and display composition data for rendering the media data on a display region wherein the display composition data defines the spatial and/or temporal relationship between one or more media entities of the media data, the display region being composed of one or more display sub-regions the apparatus comprising a modification parameter setting module for setting a modification lock parameter for a display region and/or a display sub-region indicating whether or not the visual configuration of the respective display region or display sub-region may be modified by a user, and a transmitter for transmitting the media data, display composition data and the modification lock parameter.

In an embodiment the modification parameter setting module is further configured to set a view lock parameter indicating whether or not the content of a media entity associated with a display region may be displayed on another display region.

In an embodiment the modification parameter setting module is further configured to set an area lock parameter indicating whether or not the content of a media entity of a display sub-region may be displayed on another display sub-region.

In an embodiment, the modification parameter setting module is further configured to set a display visibility parameter defining the minimum proportion of a respective media entity to be visible during display on the corresponding display region.

In an embodiment, the modification parameter setting module is further configured to set a display visibility parameter defining the minimum proportion of a respective display sub-region to be visible during display on the display region.

A further aspect of the invention provides a terminal device for modifying the display of one or more media entities on a display region of a display device, the display region being composed of one or more display sub-regions, the user interface comprising a receiver for receiving media data, display composition data and a modification lock parameter for a display region and/or a display sub-region indicating whether or not the visual configuration of the respective display region or display sub-region may be modified by a user;
a rendering engine for determining, from the display composition data, the spatial, and/or temporal relationship between the one or more media entities;
a display for displaying content of the one or more multimedia entities on the display region in accordance with a first predefined display configuration in accordance with the display composition data and a user interface for modifying any of the display region or display sub-regions indicated as modifiable by the corresponding modification lock parameter.

In an embodiment, the user interface is configured to modify the display region in accordance with a view lock parameter indicating whether or not the content of a media entity associated with a display region may be displayed on another display region.

In an embodiment, the user interface is configured to modify any one of the display sub-regions in accordance with an area lock parameter indicating whether or not the content of a media entity associated with a display sub-region may be displayed on another display sub-region.

In an embodiment the user interface is configured to modify any one of the display sub-regions in accordance with a display visibility parameter defining the minimum proportion of a corresponding media entity to be visible during display on the display region.

A yet further aspect of the invention provides a data package comprising media data of one or more media entities for rendering on at least one display region, a display region being composed of one or more sub-regions, compositional data defining spatial and/or temporal relations between the one or more media entities; and display modification data including at least one of
a modification lock parameter for each display region and/or display sub-region indicating whether or not the visual configuration of the respective display region or display sub-region may be modified by a user; a view and/or area lock parameter indicating whether or not the content of a media entity associated with a display region or display sub-region may be displayed on another display region or display sub-region; and a display visibility parameter defining the minimum proportion of the media entity to be visible during display on the display region;

In one embodiment, the display modification data is comprised in the composition data. In an alternative embodiment the display modification data is separate to the composition data.

A further aspect of the invention provides an electronic device comprising memory, one or more processors; and one or more modules stored in the memory and configured for execution by the one or more processors, the one or more modules including instructions for modifying the display of content of one or more media entities of media data on at least one display region, a display region being composed of one or more display sub-regions, comprising: receiving display composition data defining the spatial and/or temporal relationship between one or more media entities of media data and display modification data for a respective display region and/or a respective display sub-region, on which one or more media entities are rendered, indicating how the visual configuration of the respective display region or display sub-region may be modified by a user the display modification data comprising a modification lock parameter indicating whether or not the visual configuration of the respective display region or display sub-region may be modified by a user and at least one modification parameter indicating modification constraints imposed on user modifications of the visual configuration of the respective display region or sub-region; rendering content of the one or more multimedia entities on the display region in accordance with a first display configuration in accordance with the display composition data, wherein any one of the display region or display sub-regions indicated as modifiable by the corresponding modification lock parameter may be modified by an end user within the constraints indicated by the at least one modification parameter.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RE signal.

BRIEF DESCRIPTION OF THE DRAWINGS

Embodiments of the invention will now be described, by way of example only, and with reference to the following drawings in which.

DETAILED DESCRIPTION

Figure 1:
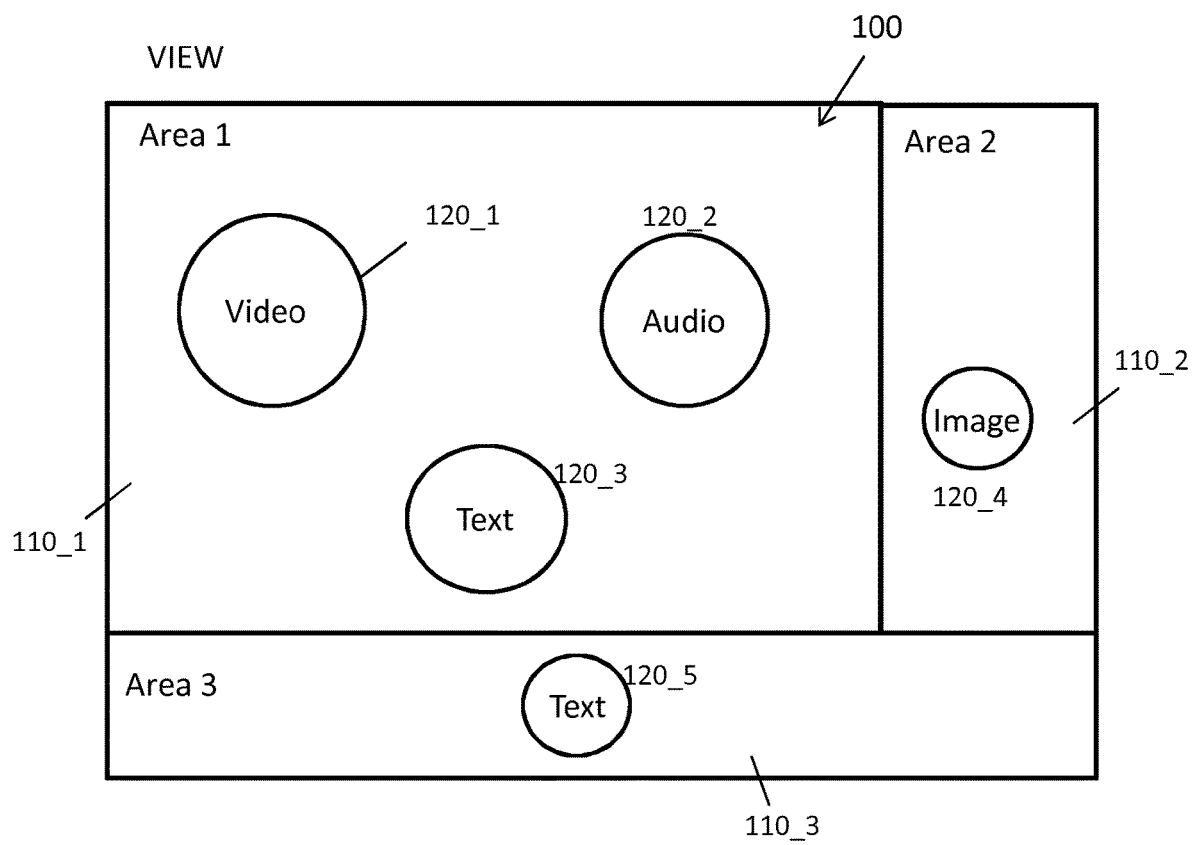
FIG. 1 schematically illustrates an example of a view of MMT-CI.

Embodiments of the invention will be described in the context of MMT (Multimedia Transport), and in particular in the context of MMT Composition information (CI). Compositional information defines the presentation aspects of multimedia data and is used to control the temporal and spatial layout of various components of media data content (e.g. MMT assets or MPUs) to be rendered on one or more displays.

In MMT the term "Asset" refers to a data entity containing data with the same transport characteristics and that is composed of one or more MPUs (media processing units) with same Asset ID, the term "Package" refers to a logical collection of data, which is composed of one or more Assets and their related Asset Delivery Characteristics (i.e., description about required Quality of Service for delivery of Assets), and Composition Information (CI) (i.e., description of spatial and temporal relationship among Assets).

MMT-CI specifies the relational arrangement between media content components such as MMT assets or MPUs for consumption and presentation and defines the following:

spatial composition, i.e. the position of each media content component rendered in a view;
temporal composition i.e. the timing synchronization between media content components;
multiple views for supporting simultaneous display or virtual displays on one or more display devices.

In particular the CI provides synchronization information for delivery of the various media content components. Composition information may be specified using HTML5 and XML. An HTML5 document provides initial information on spatial relationships between media content components (e.g. MMT assets or) and a CI document defined in XML provides information on temporal relationships between the various media content components to complement the associated HTML document. The CI layer is descriptive language extending the HTML5 page and defining the association of MMT components (e.g. MMT assets) of a MMT package as a resource of presentation, the temporal information needed for delivery and consumption order of MMT components, and the mapping of MMT components to a particular view.

To support descriptive representation of temporal relationships among media data content components (such as MMT assets or MPUs) and mapping of media data to be consumed on multiple devices, the composition layer defines several elements and attributes as follows:

association of HTML5 media elements and media data as resources;
temporal information of presentation time of the media data;
designation of certain components of the media data to be presented on a particular screen in a multi-screen environment;

A typical MMT CI processing engine first processes the HTML5 page associated with an MMT package containing MMT-CI and one or more MMT assets in order to define the initial spatial composition of the MMT assets and parses CI data to control the presentation in time.

The HTML5 file is typically parsed into a Document Object Model (DOM) tree and stored in memory. The CI processing engine applies changes to the DOM at specified time according to the information contained in the CI file. The DOM nodes/elements are referenced using their identifiers or possibly using a certain pattern (e.g. provided through jQuery selectors).

FIG. 1 schematically illustrates an example of a view in MMT-CI. A view 100 represents a whole display region which may be composed of one or more Areas or display sub-regions. In the illustrated example the view is divided into three sub-regions 110_1, 110_2 and 110_3 named Area 1, Area 2 and Area 3 respectively. One or more MMT media assets 120_1 . . . 120-5 are rendered in each Area.

Figure 2:
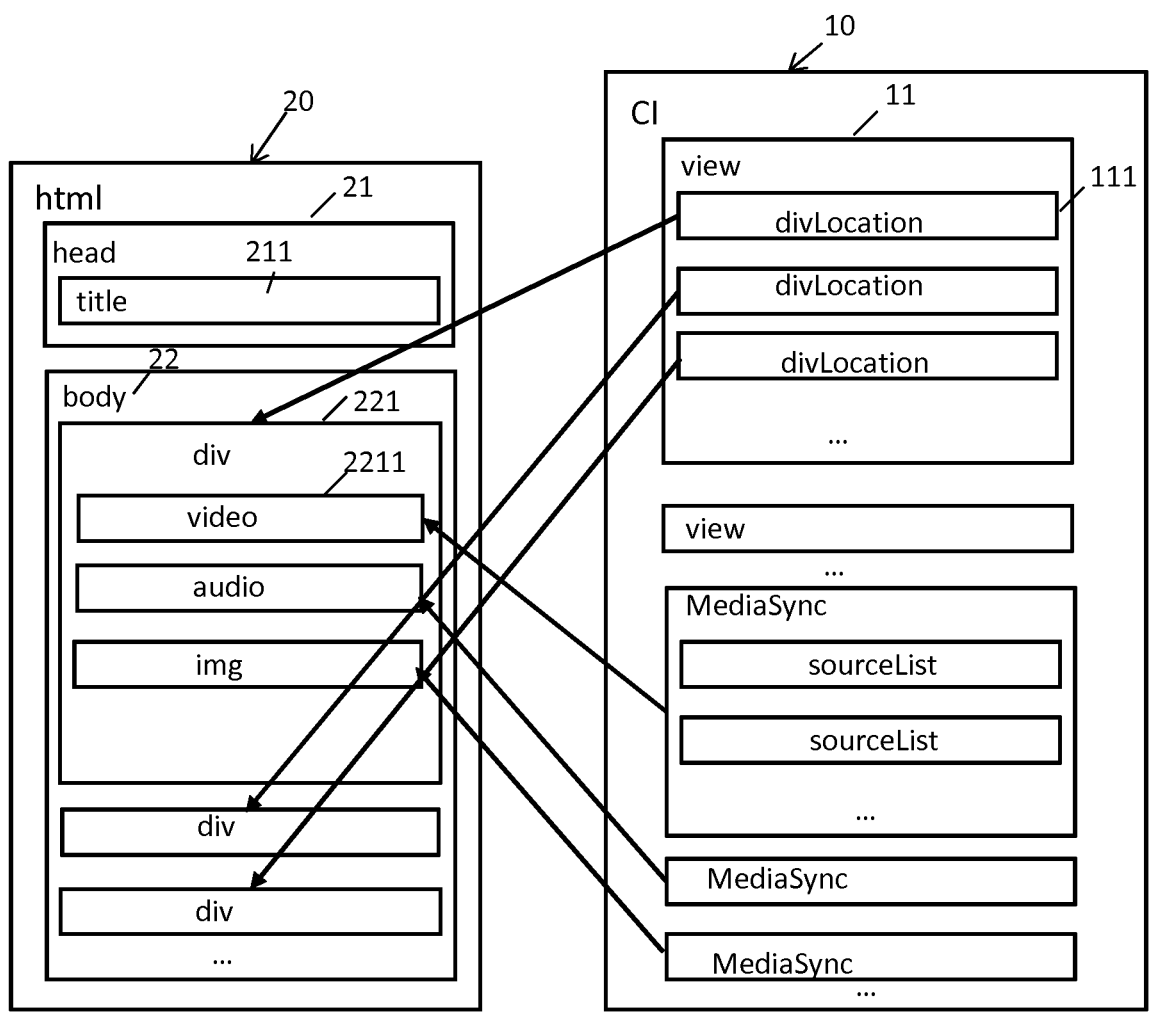
FIG. 2 schematically illustrates an example of the basic structure of MMT-CI and its relationship with a corresponding HTLM document.

MMT-CI describes the spatial and temporal relationship in a MMT Package in terms of Assets, Area and a View. FIG. 2 schematically illustrates an example of the basic structure of CI. CI includes a CI document 10 associated with an MMT package and an associated HTML5 page, 20. As illustrated, the basic structure of the CI document is derived from the structure of the HTML5 document.

The root element of MMT-CI is the HTML document 20. HTML document 20 is a HTML5 document including HTML5 media elements, which maybe any of video, audio, img, or track elements together with their associated spatial information. A reference to the CI document may be included in the HTML5 document, typically as part of the Javascript that launches the CI parser. Spatial information of the media elements is used to present the corresponding media data (such as the MMT Assets). The body element of the HTML5 document includes more than one spatial area (i.e. div element), if partial consumption of the presentation on multiple screens is to be allowed.

In the example illustrated in FIG. 2 the HTML5 document 20 contains two main elements—head and body elements 21 and 22. Some elements in the head and body elements 21, 22 are extended or added in order to meet the requirements of MMT-CI.

Head element 21 contains a title element 211 to provide information about the MMT package. A View element 11, corresponding to a View, provides spatial and temporal information on the View. A divLocation element 111 corresponding to an Area of a View, provides temporally changed special information about the Area. The body element 22 includes div elements 221 which contain MMT Asset elements 2211 such as video, audio, img, text etc. The div element 221 provides spatial information about an Area. The MMT Asset 2211 (video, audio . . .): provides spatial and temporal information of a MMT Asset.

The CI document 10 provides temporal information about Views, Areas and media data. The root element of the CI document 10 is the CI element, which may contain elements such as view and MediaSync elements. The roles of these elements are as follows:
view: provides temporal information about the spatial changes of a View and its Areas.
MediaSync: provides temporal information about the presentation of media data (e.g. MMT assets).
An area element —divLocation element—is a child element of a view element and provides information on spatial changes in time of the corresponding area of the view.

The initial Areas in a View that can be consumed by a single MMT display are generated by the div element 221 of the HTML page 20, and the spatial changes in time of the initial Areas in the View can be obtained by a divLocation element 111 of the MMT CI document. The div element 221 and the divLocation element 111 enable the spatial location of the Areas of a view to be dynamically changed and updated without reloading an entire HTML5 pages.

Basically the HTML5 page enables the initial view to be described and the CI document enables the view to be updated and new additional views to be created. Updates may include spatial or temporal modification of the view, introduction of new views, or introduction of new assets. The MediaSync element in the CI layer provides temporal information (usually synchronization info) on the media assets.

Embodiments of the invention for providing display modification data for media data which enables the compositional arrangement to be modified within constraints will be described with reference to FIGS. 3 to 8.

The initial positions and sizes of graphic media assets (e.g. images or videos or text) of a MMT package within an initial view are defined as Areas in the HTML5 page associated with the MMT package using CSS style sheets or CSS inline style parameters.

Previously, if a content provider wished to prevent any modification of the position of those defined Areas, the only solution offered by CSS stylesheets was to use "position: fixed" as a style and specify the position of objects using pixel coordinates with respect to the end display. However this is not a viable solution as the actual size (in terms of number of pixels per line and per columns) of the end display is not known at the time the HTML5 page is created. Such a solution would only work in environments where the end display has a fixed well-known resolution. This is not the case with TV sets, for example.

In embodiments of the present invention one or more modification parameters are provided for enabling modification within predefined constraints when a view is created.

In one particular embodiment of the invention, in order to indicate whether or not modification of the display of MMT assets of a View is allowable, a modification lock parameter is provided as a modification parameter. The modification lock parameter may be in Boolean form for example. The modification lock parameter is associated with a view or an area and has a value indicating whether or not the corresponding view or area may be modified by the user. In a general embodiment, the modification lock parameter is included in the composition information. In one particular example the modification lock parameter may be included in the view and divLocation elements of the composition information of a MMT package. A respective modification lock parameter for a View is included in the respective View element of the CI document. A respective modification lock parameter for an Area is included in the respective area element (divLocation element) of the CI document. In this example the modification lock parameter is referred to as "isLocked" and has a default value which is set to "TRUE" signifying to the rendering browser receiving the media data and the composition data that a View or Area referred to by the corresponding view or divLocation elements cannot be modified. In order to allow modification of the display, at the time the view is created, the modification lock parameter is set to "FALSE". Providing a modification lock parameter both at the view level and at the area level enables the whole view or only certain areas of a view to be modifiable. In one particular embodiment, the actual modification of MMT-CI XML schema involves including a line, such as the following, within the definition of "viewType" and "divLocationType" of the CI:

<xsd:attribute name="isLocked" type="xsd:boolean" use="optional" default="TRUE"/>

In a further embodiment of the invention a lock to view parameter may be provided for an area to indicate that the corresponding area of a view may not be moved to another view. For example, a content provider may wish to specify that specific media content of an MMT asset in an area stays on one specific View and cannot be moved to another view (for instance, main AV content cannot be sent to secondary display screen).

In one particular embodiment the view lock parameter is provided by modifying a divLocation element of the CI document of MMT-CI to introduce a new Boolean parameter, referred to in this example as "isLockedToView" and having a default value "TRUE". When set to "TRUE", the lock to view parameter indicates to a rendering browser that the respective Area cannot be sent to another View. The modification of MMT-CI XML schema may be performed, for example, by adding the following line within the corresponding definition of "divLocationType":

<xsd:attribute name="isLockedToView" type="xsd:boolean" use="optional" default="TRUE"/>

In a further embodiment of the invention an Area lock parameter may be provided to indicate that a media asset associated with an Area may not be moved to another Area.

In an embodiment of the invention, in order to define the minimum visibility of a graphical media object on a display, a minimum visibility parameter is provided. A minimum visibility parameter, associated with an area, defines the minimum proportion of the area to be visible on the display. In one particular embodiment the minimum visibility parameter is included in the divLocation element, corresponding to the area, in the associated MMT-CI. The minimum visibility parameter defines a percentage attribute "minVisibility" that informs the rendering browser how much visibility of the corresponding Area (display sub-region) should always be ensured. A "minVisibility" of "100" on an Area ensures that no other Area can overlap that Area. The default value of this new parameter is set to "0" in order to be compatible with the default behavior of HTML5 and CSS. The visibility value of an Area can be determined by computing the ratio between the surface area of the Area and the surface area of all other Areas overlapping with the Area. In case, transparency is used, the surface area of all Areas (main and overlapping ones) is weighted by the amount of transparency as shown in the equation below:

$$\text{Visibility}(Area_N) = \frac{\text{Transparency}(Area_N) * \text{Surface}(Area_N)}{\sum_{i=1}^{i=n} \text{Transparency}(Area_i) * \text{Surface}(Area_i)}$$

where Area refers to all Areas overlapping with $Area_N$

In one particular embodiment, the minimum visibility parameter is provided by introducing a percentage type parameter to the MMT-CI The modification of an MMT-CI XML schema involves creating the percentage type with the following lines within the type creation section of the schema:

```
<xsd:simpleType name="Percentage">
    <xsd:restriction base="xsd:unsignedShort">
        <xsd:minInclusive value="0"/>
        <xsd:maxInclusive value="100"/>
    </xsd:restriction>
</xsd:simpleType>
``` and adding the following line within the definition of "divLocationType":

```
<xsd:attribute name="minVisibility" type="Percentage" use="optional" default="0"/>
```

While in the embodiments hereinbefore described, the display modification parameters (modification lock parameter, View or Area lock parameter and display visibility parameter) are included in the CI it will be appreciated that in other embodiments of the invention, the display modification parameters may be sent separately to the CI.

With the introduction of the modification parameters described above, one or more Views on an MMT package may be personalized by a user. In this way an end user can decide on the composition of Areas for each View within the restrictions imposed by the modification parameters. All of the above modification parameters may be provided or one or more of the modification parameters may be provided.

Example of user interfaces allowing a user to alter the presentation of one or more media entities on a display, in accordance with an embodiment of the invention will now be described. The user interface may be implemented on a touch screen device such as a tablet although it will be appreciated that similar functionalities could also be offered on traditional screens provided with a user input interface such as a keyboard or a joystick.

In one embodiment from analysis of the MMT-CI, it is possible to identify all the different Views and all the different Areas associated with a MMT package and the initial spatial composition of the different Areas within a View. A personalization user interface may be provided on a second display different to the original rendering display. MMT-CI info may be sent to the display device of the second display. A user can modify the View on the second display in accordance with the modification parameters as hereinbefore described, and send the modified view to the original rendering device for processing of the updates so that the media content may be rendered on the display in accordance with the modifications made by the user.

If several views are defined in the MMT-CI XML fragment, a choice is offered to the user about which view he wishes to modify. For example, on a touch screen, selection means could be provided by means of a physical menu button or a configuration button present on the user interface.

Figure 3:
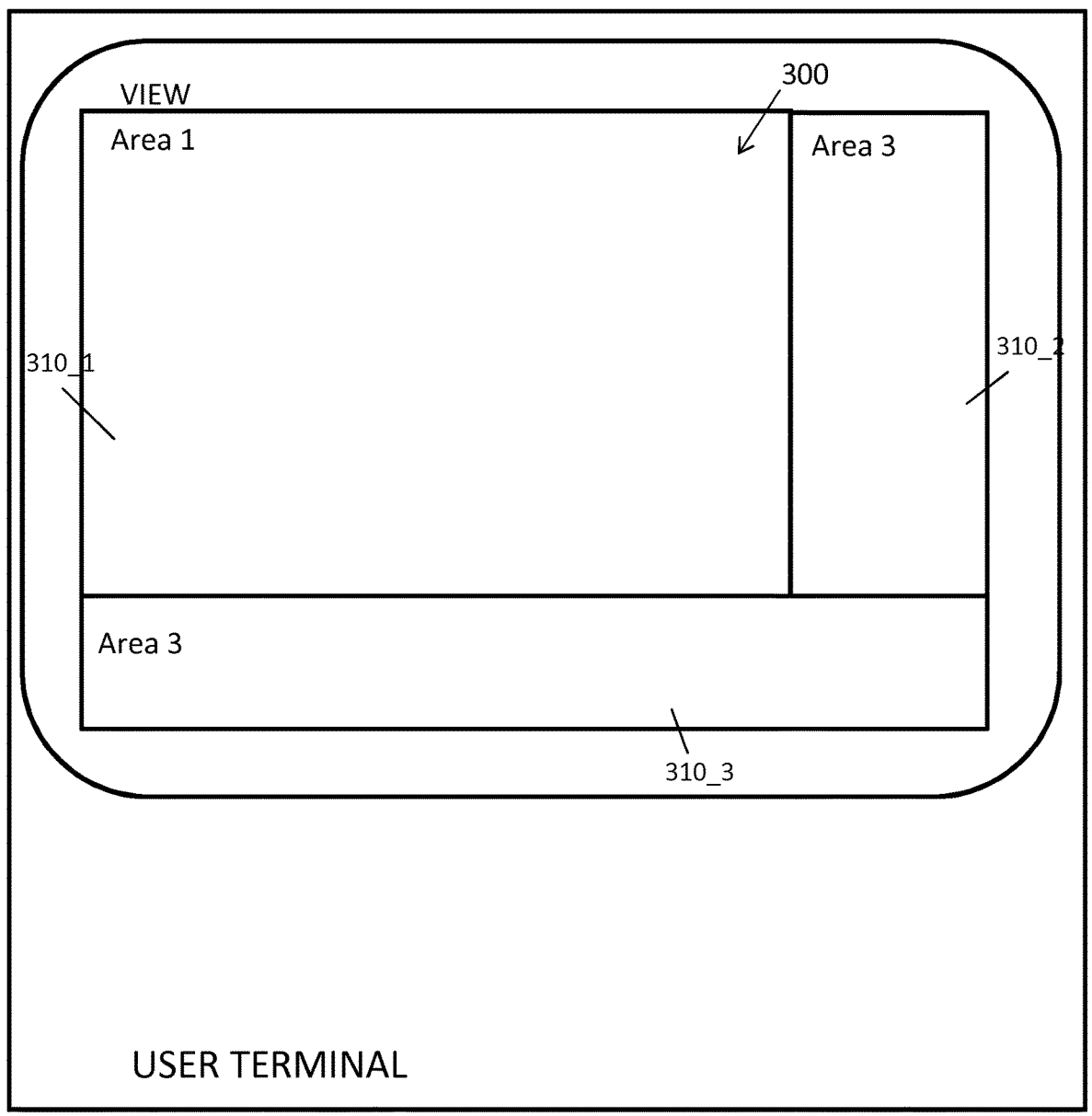
FIG. 3 schematically illustrates an example of a view for modification by a user in accordance with an embodiment of the invention.

Once a View is selected (or if there is only one View), the different Areas of the view with their position and sizes as defined on the MMT-CI XML fragment are displayed to the user. Such information is easily accessible by browsing the different divLocation elements of the CI, selecting the divLocation elements for which the begin attribute is set to 0s, and reading the CSS style parameter. FIG. 3 schematically illustrates an example of the view 300 presented to the user on a display device 350 when the CI defines 3 Areas 310_1, 310_2 and 310_3 as in the example of FIG. 1.

By using traditional drag'n'drop and pinch'n'zoom techniques available on touch screens, the user can modify the position and size of each Area 310 of the View 300, indicated as modifiable by the corresponding modification lock parameter, within the constraints imposed by the modification parameters. The rendering engine of the user terminal 350 verifies the modification lock parameter "isLocked" attribute of the View 300 and each Area 301, 2 before allowing an Area to be modified. Similarly when an Area is resized, the CSS style is verified and the resize, min-width, max-width, min-height and max-height attributes are enforced if present. If the user wishes to make two Areas overlap, the minimum visibility parameter of the overlapped Area is verified if a "minVisibility" attribute has been set for this Area by the corresponding display visibility parameter.

When several Views are defined in the CI, the user is provided with means to move Areas between different Views. In one example this manipulation is performed by means of a contextual menu associated with each Area providing the following actions enabling areas to be sent from one view to another. For example: "Send Area to a different View" and "Import Area from a different View". Once an action is selected, the user interface is used to select which view to export to or import from. On a touch screen, for example a contextual menu could be obtained in response to prolonged touch pressure (a hold gesture) on the Area. If the view lock parameter for that area signifies that the area cannot be moved from the original view (e.g. "isLockedToView is set to TRUE) then the area remains fixed in the original view and is prevented from being moved from one view to another by means of the user interface.

Once the user has finished the personalization of the composition, a Save action accessible through a physical menu button or a configuration button present on the interface can be triggered. The modified CI fragment can then be sent back to the main display for processing.

Figure 4:
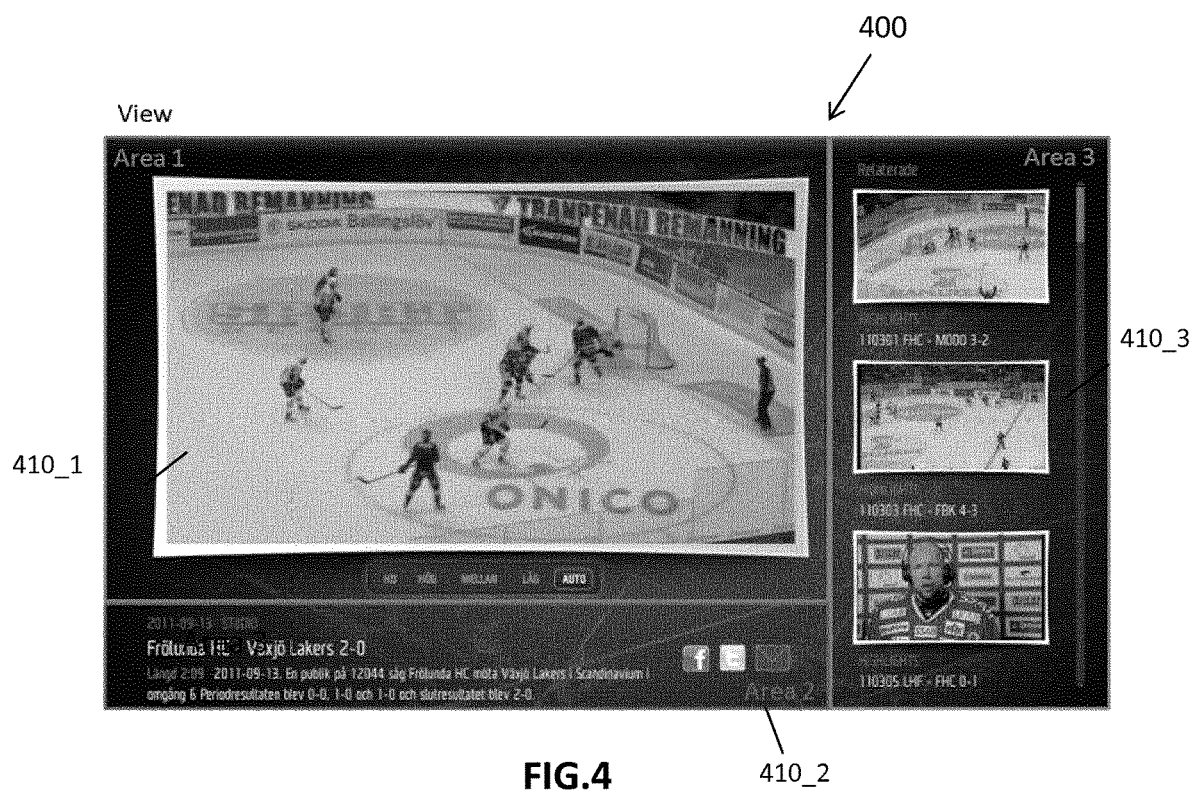
FIG. 4 schematically illustrates another example of a view for modification by a user in accordance with an embodiment of the invention.

In a further embodiment of a user interface for enabling the composition to be modified the user interface operation is based on the MMT-CI layer and MMT package HTML5 page The information regarding the media assets present in all Areas is described in the HTML5 page associated with the MMT package. Therefore, by sending both the CI XML fragment and the HTML5 page to a second display device for personalization, it is possible to offer a user interface similar to the interface of the first example but on which the graphical Areas can be filled with the actual media content of the respective media entity. FIG. 4 illustrates such an example in which View 400 is composed of Areas 410_1, 410_2 and 410_3. Video content is presented in Area 1 410_1, text data is presented in Area 2 410_2 and image content is presented in Area 3 410_3, and.

Figure 5:
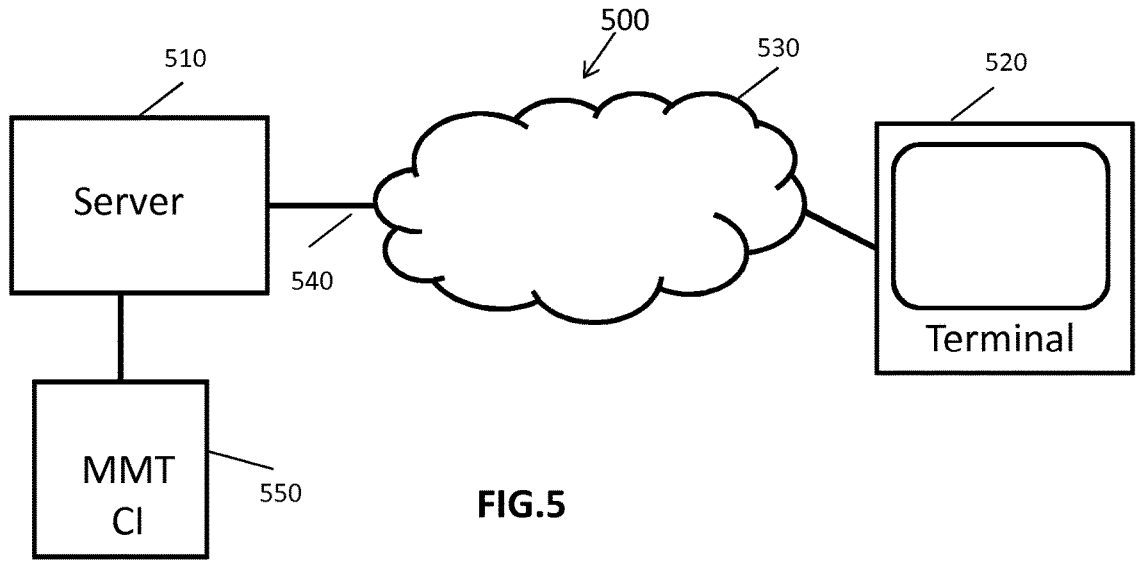
FIG. 5 is a block diagram of an example of a data communication system in which one or more embodiments of the invention can be implemented.

FIG. 5 schematically illustrates a data communication system in which one or more embodiments of the invention may be implemented. The data communication system 500 comprises a transmission device, in this case a server 510, which is operable to transmit data packets of a data stream to a receiving device, in this case a client terminal 510, via a data communication network 530. The data communication network 530 may be a Wide Area Network (WAN) or a Local Area Network (LAN). Such a network may be for example a wireless network (Wifi I 802.IIa or b or g), an Ethernet network, an Internet network or a mixed network composed of several different networks. In a particular embodiment of the invention the data communication system may be a digital television broadcast system in which the server 510 sends the same data content to multiple clients 520.

The data stream 540 provided by the server 510 comprises multimedia data representing video and audio data transmitted in the form of MMT packages with composition information. Multi-media data includes data of various types of media data such as images, audio and text (character strings) The composition information defines temporal/spatial arrangement data of the multi-media assets. The temporal/spatial arrangement data determines the reproduction timing and reproduction form for each component or media entity of the media data, i.e. the temporal/spatial arrangement, for example when to reproduce the media data and/or in what position to display the media data.

The server 510 is provided with an encoder for encoding video and audio streams in particular to provide a compressed bitstream for transmission that is a more compact representation of the data presented as input to the encoder. The server is further provided with a MMT device 550 for providing the modification parameters, as defined in the preceding examples, for modifying the presentation of the media content as defined in the compositional information within predefined constraints.

The client 520 receives the transmitted bitstream and decodes the reconstructed bitstream to render the multimedia data on the client terminal. User of client 520 may modify the presentation of the multimedia content in accordance with the constraints set by the modification parameters of embodiments of the invention.

Figure 6:
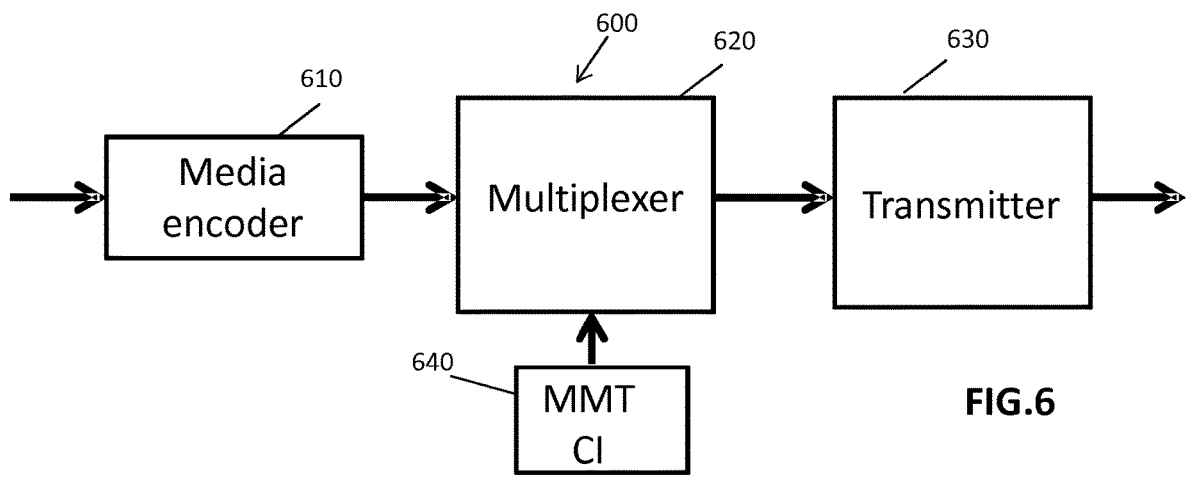
FIG. 6 is a block diagram of an example of a transmission device in which one or more embodiments of the invention can be implemented.

FIG. 6 illustrates a transmitting apparatus 600 in accordance with an embodiment of the invention. The input media data, for example, audio and video data, are encoded at media encoder 610. The encoded data is multiplexed at multiplexer 620, and transmitted at transmitter 630. The transmitting system may be used in a typical broadcast TV environment, or may be used in a mobile device that provides audiovisual service. MMT CI module 640 sets the modification parameters, as defined in the preceding examples, for modifying the presentation of the media content as defined in the compositional information.

Figure 7:
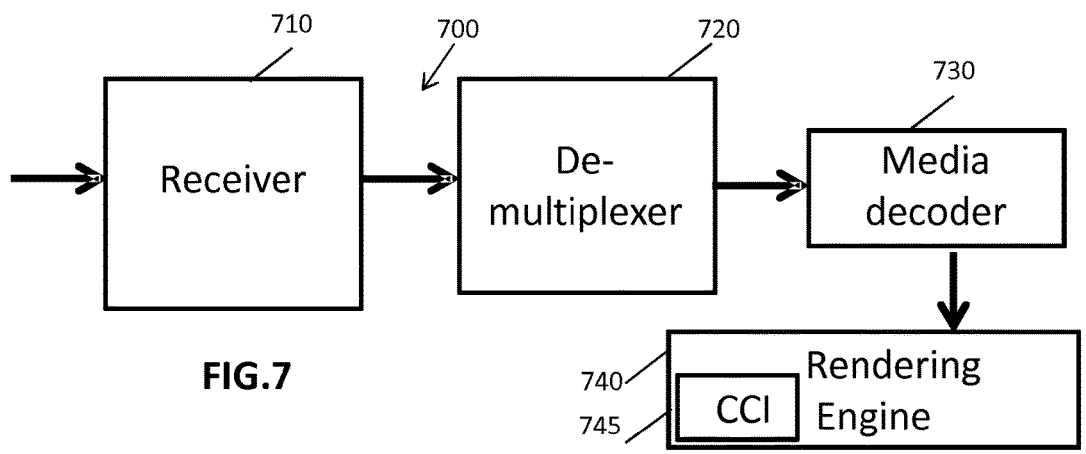
FIG. 7 is a block diagram of an example of a terminal device in which one or more embodiments of the invention can be implemented.

FIG. 7 illustrates a user terminal 700 in accordance with an embodiment of the invention. The input data of user terminal 700 may be a transport bitstream, for example, the output of transmission apparatus 600. The data is received at receiver 710, de-multiplexed at de-multiplexer 720, and then decoded at media decoder 730. Decoded packets can be placed in a buffer of de-multiplexer 720. Rendering Engine 740 renders the media content in accordance with the temporal/spatial relationship defined in the MMT CI data and the modification parameters. The rendering engine is provided with a CI agent 745 for processing the composition information including HTML5 page and CI document.

Figure 8:
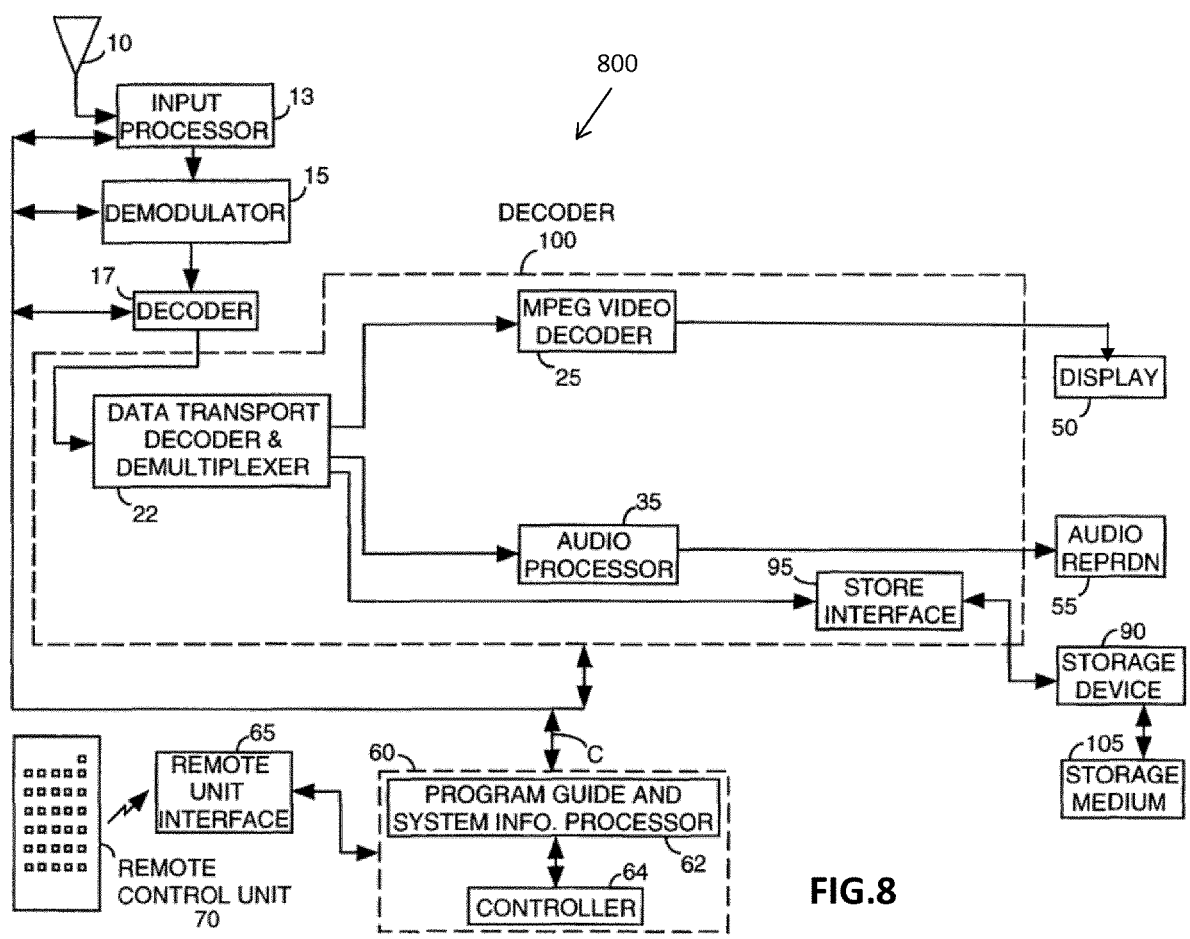
FIG. 8 is a block diagram of another example of a terminal device in which one or more embodiments of the invention can be implemented.

FIG. 8 illustrates a receiving system 800 in which one or more embodiments of the invention may be implemented. In overview, in the video receiver system of FIG. 8, a broadcast carrier modulated with signals carrying audio, video and associated data representing broadcast program content is received by antenna 10 and processed by input processor 13. The resultant digital output signal is demodulated by demodulator 15. The demodulated output from unit 15 is trellis decoded, mapped into byte length data segments, deinterleaved and Reed-Solomon error corrected by decoder 17. The output data from unit 17 is in the form of an MPEG compatible transport datastream containing program representative multiplexed audio, video and data components. The transport stream from unit 17 is demultiplexed into audio, video and data components by unit 22 which are further processed by the other elements of decoder 100. In one mode, decoder 100 provides MPEG decoded data for display and audio reproduction on units 50 and 55, respectively in accordance with the temporal/spatial relationships defined by corresponding composition information and modification performed in accordance with modification parameters of embodiments of the invention. In another mode, the transport stream from unit 17 is processed by decoder 100 to provide an MPEG compatible datastream for storage on storage medium 105 via storage device 90.

A user selects for viewing either a TV channel or an on-screen menu, such as a program guide, by using a remote control unit 70. Processor 60 uses the selection information provided from remote control unit 70 via interface 65 to appropriately configure the elements of FIG. 8 to receive a desired program channel for viewing. Processor 60 comprises processor 62 and controller 64. Unit 62 processes (i.e. parses, collates and assembles) program specific information including program guide and system information and controller 64 performs the remaining control functions required in operating decoder 100. Although the functions of unit 60 may be implemented as separate elements 62 and 64 as depicted in FIG. 8, they may alternatively be implemented within a single processor. For example, the functions of units 62 and 64 may be incorporated within the programmed instructions of a microprocessor. Processor 60 configures processor 13, demodulator 15, decoder 17 and decoder system 100 to demodulate and decode the input signal format and coding type.

Considering FIG. 8 in detail, a carrier modulated with signals carrying program representative audio, video and associated data received by antenna 10, is converted to digital form and processed by input processor 13. Processor 13 includes radio frequency (RF) tuner and intermediate frequency (IF) mixer and amplification stages for downconverting the input signal to a lower frequency band suitable for further processing.

It is assumed for exemplary purposes that a video receiver user selects a sub-channel (SC) for viewing using remote control unit 70. Processor 60 uses the selection information provided from remote control unit 70 via interface 65 to appropriately configure the elements of decoder 100 to receive the physical channel corresponding to the selected sub-channel sc.

The output data provided to processor 22 is in the form of a transport datastream containing program channel content and program specific information for many programs distributed through several sub-channels.

Processor 22 matches the Packet Identifiers (PIDs) of incoming packets provided by decoder 17 with PID values of the video, audio and sub-picture streams being transmitted on sub-channel sc. These PID values are pre-loaded in control registers within unit 22 by processor 60. Processor 22 captures packets constituting the program transmitted on sub-channel SC and forms them into MPEG compatible video, audio data streams for output to video decoder 25, audio decoder 35 respectively. The video and audio streams contain compressed video and audio data representing the selected sub-channel SC program content.

Decoder 25 decodes and decompresses the MPEG compatible packetized video data from unit 22 and provides decompressed program representative pixel data to device 50 for display. Similarly, audio processor 35 decodes the packetized audio data from unit 22 and provides decoded audio data, synchronized with the associated decompressed video data, to device 55 for audio reproduction.

The MPEG data can be rendered in accordance with the temporal/spatial relationships defined by corresponding composition information and modification performed in accordance with modification parameters of embodiments of the invention.

In a storage mode of the system of FIG. 8, the output data from unit 17 is processed by decoder 100 to provide an MPEG compatible datastream for storage. In this mode, a program is selected for storage by a user via remote unit 70 and interface 65.

Processor 60, in conjunction with processor 22 forms a composite MPEG compatible datastream containing packetized content data of the selected program and associated program specific information. The composite datastream is output to storage interface 95. Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

Embodiments of the invention described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, tablets, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Although the present invention has been described hereinabove with reference to specific embodiments, the present invention is not limited to the specific embodiments, and modifications will be apparent to a skilled person in the art which lie within the scope of the present invention.

For instance, while the foregoing examples have been described with respect to MMT assets it will be appreciated that the invention may be applied to other forms of media entities or components, or other forms of data.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method of transmitting display composition data for rendering content of media data on at least one display region, a display region being composed of one or more display sub-regions, wherein the display composition data comprises MPEG Multimedia Transport Composition Information, MMT-CI, defining at least one of a spatial relationship and a temporal relationship between content components of the media data, the method comprising:
   transmitting display modification data, for a respective display region and/or a respective display sub-region, the display modification data indicating how the visual configuration of the respective display region or display sub-region may be modified by a user to create a view, wherein the display modification data comprises a modification lock parameter indicating whether or not the visual configuration of the respective display region or display sub-region may be modified by a user as part of the view and at least one modification parameter indicating modification constraints imposed on user modifications of the visual configuration of the respective display region or sub-region, wherein
   the MMT-CI further defines multiple views for supporting simultaneous displays on one or more display devices, and
   the modification parameter further comprises a lock to view parameter indicating whether or not an area of a view created on one display device may be moved to another view created on another display device.

2. A method according to claim 1, wherein the at least one modification parameter comprises a lock to view parameter indicating whether or not media data displayed on a respective display region may be displayed on another display region different to the respective display region.

3. A method according to claim 1, wherein the at least one modification parameter comprises, a lock to view parameter associated with a corresponding display-sub region of the display region and indicates whether or not the corresponding display-sub region may be rendered on another display region different to the display region.

4. A method according to claim 3, wherein the lock to view parameter is included in an area element of the composition data corresponding to the display sub-region.

5. A method according to claim 1, wherein the at least one modification parameter comprises a display sub-region visibility parameter defining the minimum proportion of the respective display sub-region to be visible during display.

6. A method according to claim 5, wherein the display sub-region visibility parameter is based on the ratio of the surface area of the display sub-region and the total surface area of other display sub-regions overlapping the display sub-region.

7. A method according to claim 1, wherein the at least one modification parameter comprises a display visibility parameter defining the minimum proportion of the media content component to be visible during display on the corresponding display region or display sub-region.

8. A method of displaying content of media data on at least one display region, a display region being composed of one or more display sub-regions, the method comprising:
   receiving display composition data for rendering content of media data on at least on display region, wherein the display composition data comprises MPEG Multimedia Transport Composition Information, MMT-CI, defining at least one of a spatial relationship and a temporal relationship between content components of the media data, and display modification data, for a respective display region and/or a respective display sub-region, the display modification data indicating how the visual configuration of the respective display region or display sub-region may be modified by a user;
   rendering content components of the media data on the display region in accordance with a first display configuration defined by the display composition data, wherein a display region or display sub-regions may be modified by the user to create a view in dependence upon the display modification data, wherein the display modification data comprises a modification lock parameter indicating whether or not the visual configuration of the respective display region or display sub-region may be modified by the user as part of the view and at least one modification parameter indicating modification constraints imposed on user modifications of the visual configuration of the respective display region or sub-region, wherein
   the MMT-CI further defines multiple views for supporting simultaneous displays on one or more display devices, and
   the modification parameter comprises a lock to view parameter indicating whether or not an area of a view created on one display device may be moved to another view created on another display device.

9. A non-transitory computer-readable storage medium storing a sequence of instructions executable by a programmable apparatus to perform a method according to claim 1.

10. A method according to claim 8, wherein the at least one modification parameter comprises a lock to view parameter associated with a corresponding display-sub region of a display region and indicates whether or not the corresponding display-sub region may be rendered on another display region different to the display region.

11. A method according to claim 8, wherein the at least one modification parameter comprises a display sub-region visibility parameter defining the minimum proportion of the respective display sub-region to be visible during display.

12. An apparatus configured to transmit display composition data for rendering content of media data on at least one display region, a display region being composed of one or more display sub-regions, wherein the display composition data comprises MPEG Multimedia Transport Composition Information, MMT-CI, defining at least one of a spatial relationship and a temporal relationship between content components of the media data, the apparatus comprising:
   a display modification parameter setting module configured to set display modification parameters for a display region and/or a display sub-region indicating how the visual configuration of the respective display region or display sub-region may be modified by a user to create a view; and
   a transmitter configured to transmit the display composition data and the display modification parameters, wherein the display modification parameter setting module is configured to set a modification lock parameter indicating whether or not the visual configuration of the respective display region or display sub-region may be modified by a user as part of the view and to set at least one modification constraint parameter indicating modification constraints imposed on user modifications of the visual configuration of the respective display region or sub-region, wherein
   the MMT-CI further defines multiple views for supporting simultaneous displays on one or more display devices, and the modification parameter comprises a lock to view parameter indicating whether or not an area of a view created on one display device may be moved to another view created on another display device.

13. An apparatus according to claim 12, wherein the display modification parameter setting module is configured to set a lock to view parameter associated with a corresponding display-sub region of the display region and indicating whether or not the corresponding display-sub region may be rendered on another display region different to the display region.

14. An apparatus according to claim 12, wherein the display modification parameter setting module is configured to set a display sub-region visibility parameter defining the minimum proportion of the respective display sub-region to be visible during display.

15. A terminal device configured to modify the display of content of media data on at least one display region, a display region being composed of one or more display sub-regions, the terminal device comprising:
 a receiver configured to receive display composition data to render content of media data on at least one display region, wherein the display composition data comprises MPEG Multimedia Transport Composition Information, MMT-CI, defining at least one of a spatial relationship and a temporal relationship between content components of the media data, and configured to receive display modification data for a respective display region and/or a respective display sub-region, the display modification data indicating how the visual configuration of the respective display region or display sub-region may be modified by a user to create a view;
 a rendering engine configured to determine, from the display composition data, the spatial, and/or temporal relationship between one or more content components of the media data;
 a display configured to display content components of the media data on the display region in accordance with a first display configuration defined by the display composition data; and
 a user interface configured to modify a display region or a display sub-region in dependence upon the display modification data, wherein the display modification data comprises a modification lock parameter indicating whether or not the visual configuration of the respective display region or display sub-region may be modified by the user as part of the view and at least one modification parameter indicating modification constraints imposed on user modifications of the visual configuration of the respective display region or sub-region, wherein
 the MMT-CI further defines multiple views for supporting simultaneous displays on one or more display devices, and
 the modification parameter comprises a lock to view parameter indicating whether or not an area of a view created on one display device may be moved to another view created on another display device.

16. A terminal device according to claim 15, wherein the at least one modification parameter comprises a lock to view parameter associated with a corresponding display-sub region of the display region and indicates whether or not the corresponding display-sub region may be rendered on another display region different to the display region.

17. A terminal device according to claim 15, wherein the at least one modification parameter comprises a display sub-region visibility parameter defining the minimum proportion of the respective display sub-region to be visible during display.

18. An apparatus comprising:
 an encoder configured to encode media data including video data to produce encoded data;
 a multiplexer configured to multiplex the encoded data with display modification data; and
 a transmitter configured to transmit the multiplexed encoded data and the display modification data; wherein
 the multiplexed encoded data and the display modification data provide display composition data enabling rendering content of the media data on at least one display region of a display, a display region being composed of one or more display sub-regions;
 the display composition data comprises MPEG Multimedia Transport Composition Information, MMT-CI, defining at least one of a spatial relationship and a temporal relationship between content components of the media data; and
 the display modification data indicates how a visual configuration of the respective display region or display sub-region may be modified by a user to create a view , wherein the display modification data comprises a modification lock parameter indicating whether or not the visual configuration of the respective display region or display sub-region may be modified by a user as part of the view and at least one modification constraint parameter indicating modification constraints imposed on user modifications of the visual configuration of the respective display region or sub-region, wherein
 the MMT-CI further defines multiple views for supporting simultaneous displays on one or more display devices, and
 the modification parameter comprises a lock to view parameter indicating whether or not an area of a view created on one display device may be moved to another view created on another display device.

19. An apparatus according to claim 18, wherein the display modification data comprises a lock to view parameter associated with a corresponding display-sub region of the display region and indicating whether or not the corresponding display-sub region may be rendered on another display region different to the display region.

20. An apparatus according to claim 18 wherein the display modification data comprises a display sub-region visibility parameter defining the minimum proportion of the respective display sub-region to be visible during display.

21. Apparatus comprising:
 a receiver configured to receive display composition data enabling rendering content of media data on a display region comprising a display sub-region, wherein the display composition data comprises MPEG Multimedia Transport Composition Information, MMT-CI, defining at least one of a spatial relationship and a temporal relationship between content components of the media data, and to receive display modification data indicating how a visual configuration of the display region or display sub-region may be modified by a user to create a view;
 a processor configured to process the display composition data to determine the spatial, and/or temporal relationship between one or more content components of the media data;

a display configured to display content components of the media data on the display region in accordance with a first display configuration defined by the display composition data; and a user interface configured to enable a user to modify a display region or a display sub-region based on the display modification data, wherein the display modification data comprises a modification lock parameter indicating whether or not the visual configuration of the respective display region or display sub-region may be modified by the user as part of the view and at least one modification parameter indicating a modification constraint imposed on user modifications of the visual configuration of the respective display region or sub-region, wherein the MMT-CI further defines multiple views for supporting simultaneous displays on one or more display devices, and the modification parameter comprises a lock to view parameter indicating whether or not an area of a view created on one display device may be moved to another view created on another display device.

22. Apparatus according to claim 21, wherein the at least one modification parameter comprises a lock to view parameter associated with a corresponding display-sub region of the display region and indicates whether or not the corresponding display-sub region may be rendered on another display region different to the display region.

23. Apparatus according to claim 21, wherein the at least one modification parameter comprises a display sub-region visibility parameter defining the minimum proportion of the respective display sub-region to be visible during display.

* * * * *